United States Patent [19]
Vers

[11] 3,744,123
[45] July 10, 1973

[54] METHOD OF ASSEMBLING A RESILIENT TUBE WITH A RIGID BODY

[75] Inventor: Rudi Vers, Heidenfeld, Germany

[73] Assignee: Fichtel & Sachs AG, Schweinfurt, Germany

[22] Filed: May 11, 1971

[21] Appl. No.: 142,130

[30] Foreign Application Priority Data
May 14, 1970 Germany............... P 20 23 579.4

[52] U.S. Cl................ 29/520, 29/522, 29/526, 188/322, 285/242, 285/382
[51] Int. Cl.................. B21d 39/00, B23p 11/00
[58] Field of Search............... 29/516, 520, 522, 29/526; 188/322; 285/242, 382

[56] References Cited
UNITED STATES PATENTS
2,630,964  3/1953  Scheldorf................... 29/522 X
3,035,614  5/1962  Kirk......................... 29/516 UX Primary Examiner—Charlie T. Moon
Attorney—Kelman and Berman

[57] ABSTRACT

Resilient bellows sealingly connect a protective cup on the piston rod of a telescopic shock absorber to the cylinder of the shock absorber. The bellows are secured to the cup and the cylinder by fastening rings. Each ring is an annular channel whose web holds the bellows against the cup or the cylinder under a pressure produced by axially compressing the flanges.

5 Claims, 3 Drawing Figures

PATENTED JUL 10 1973 3,744,123

INVENTOR:
Rudi Vers
BY: Kelman and Berman,
agents

METHOD OF ASSEMBLING A RESILIENT TUBE WITH A RIGID BODY

This invention relates to annular seals formed between a tubular body of resiliently deformable material and a body of more rigid material whose surface engages a face of the tubular body, and more specifically to the assembly of the two bodies, to a method of sealing the two bodies to each other, and to a fastening ring employed in the afore-mentioned method for producing the assembly.

In its more specific aspects, the invention relates to an arrangement for protecting the seal between the cylinder and piston rod of a telescoping automotive shock absorber against contamination. The invention will be described hereinafter with reference to such a protective arrangement, but has a much wider field of application.

It is known to assemble a pliable or resiliently deformable, tubular body with another, more rigid body by axially overlapping the two bodies, and by enveloping the radially superimposed, annular portions of the two bodies with a metallic fastening ring under radial pressure exerted by the latter.

In assembling a known arrangement, the fastening ring is circumferentially shortened in order to tighten it about the enveloped bodies while in contact with the resilient body. In such a fastening method, the resilient material is unavoidable deformed circumferentially and localized stresses are locked in. The stressed portions tend to fail prematurely. No known fastening ring used in this method is of uniform cross section in all planes through its axis. It must have a circumferential portion capable of shortening which exerts less pressure than the remainder of the ring, and thus provides a less secure seal. Moreover, the known fastening rings have sharply angular edges which tend to bite into the deformable tube material and to create stress concentrations conducive to early failure.

Other sealing arrangements which avoid shortcomings of the simple system described above are relatively complex and costly. It is a primary object of this invention to provide an assembly of the type described which combines the simplicity and low cost of the first-described known arrangement with the longer useful life and other advantages of the more complex and costlier sealing arrangements.

More specifically, the invention aims at providing an annular seal between a tubular body of resiliently deformable material and a conformingly engaged surface of a more rigid body in which the engaged bodies are held against each other with a uniform pressure along the entire seal, and the resilient material is not exposed to concentrated, localized stresses.

It is a further object to provide a seal which can be formed by means of simple tools by unskilled operators.

With these and other objects in view, the invention provides an assembly including a tubular first body having an annular wall of deformable material, a second body of more rigid material, and a fastening ring of a material substantially more rigid than the deformable material.

The wall has an inner face which bounds a bore in the first body and an outer face. An annular surface of the second body conformingly engages one of the wall faces, and the fastening ring extends in a closed loop about the other wall face. The ring engages the other wall face with a pressure sufficient to hold the engaged wall under compressive stress in cooperation with the surface of the second body.

The ring is a channel of approximately U-shaped and uniform cross section. It has a web portion which engages the resilient wall and two flange portions which bound the open side of the channel and are directed away from the web portion and from the engaged wall.

The assembly is formed by engaging respective annular portions of one wall face and of the surface of the second body, superimposing on the loosely fitting fastening ring an annular portion of the other face so that the annular portions and the ring extend in a common plane, and by thereafter compressing the fastening ring transversely of that plane until the two flange portions of the ring approach each other and the web portion engages the other face of the deformable wall with the desired pressure.

The invention also resides in the fastening ring in itself.

Other features, additional objects, and many of the attendant advantages of this invention will readily be appreciated as the invention becomes better understood by reference to the following detailed description of preferred embodiments when considered in connection with the appended drawing in which.

Figure 1:
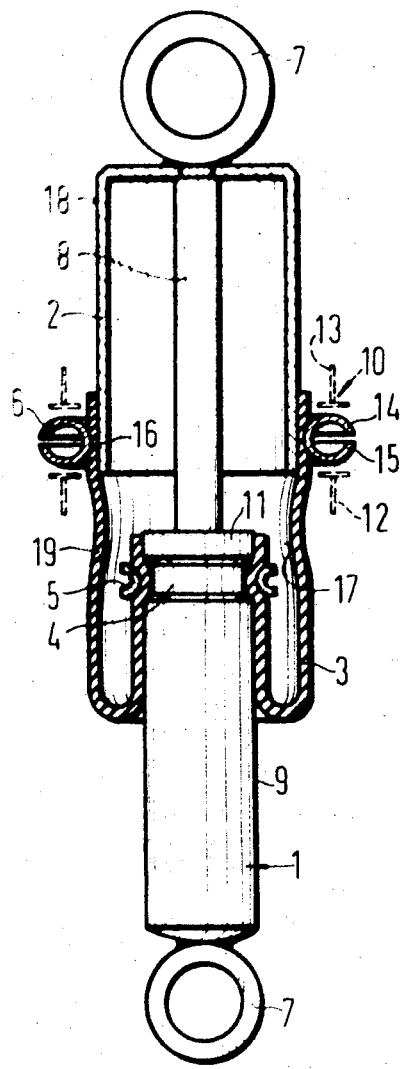
FIG. 1 shows a telescopic shock absorber whose piston rod is movably sealed to the cylinder by sealing assemblies of the invention, the view being in elevation and partly in axial section.

Referring now to the drawing in detail, and initially to FIG. 1, there is seen a telescopic shock absorber 1 of a basically conventional type. A cylinder 9 encloses and obscures a piston formed with an axial throttling passage through which a liquid may flow, the flow of the liquid and the axial movement of the piston being impeded by the small cross section of the passage. A piston rod 8 fixedly fastened to the non-illustrated piston is movably sealed in an annular radial end wall 11 of the cylinder 9. The free end of the piston rod 8 and the other radial end wall of the cylinder 9 carry eyes 7 by means of which the shock absorber may be mounted between the sprung and unsprung masses of a vehicle.

The portion of the piston rod 8 outside the cylinder 9 is protected against particulate contaminants which would shorten the useful life of the non-illustrated seal in the annular end wall 11 of the cylinder. The free end of the piston rod 8 is fixedly fastened to the bottom portion of a metal cup 2 coaxial with the cylinder 9. The open side of the cup 2 is directed toward the cylinder 9, and the cylinder is partly received in the cup 2 when the piston rod 8 moves inwardly of the cylinder from the illustrated position.

The cup 2 and the cylinder 9 are sealed to each other by bellows of soft, oil-resistant synthetic rubber or other elastomeric or at least pliable material, and this invention is more particularly concerned with the manner in which the resilient wall 3 of the bellows is sealingly assembled with the more rigid steel cup 2 and steel cylinder 9.

The resilient wall 3 is a cylindrical tube when in its relaxed condition. One of its annular end portions is stretched over the outer cylindrical surface 18 of the cup 2. The inner face 17 of the wall 3 engages the outer surface 18 under a pressure partly provided by the resiliency of the wall 3.

The inner face 17 is additionally pressed against the surface 18 by a fastening ring 6 which is of uniform, approximately C- or U-shaped cross section in all planes through the common axis of the cup 2, the piston rod 8, and the cylinder 9. The ring 6 thus is an annular channel whose web portion 16 engages the outer face 19 of the wall 3. The flange portions 14, 15 arcuately merge with the web portion 16 and extend from the same and the engaged outer face 19 in a radially outward direction. The pressure of the web portion 16 against the wall 3 is sufficient to hold the latter under compressive stress. Because of the practically uniform cross section of the ring 6, this stress is uniform over the entire circumference of the ring 6.

The other annular end portion of the wall 3 is sealed to the cylinder 9 in a similar manner. Because of the smaller diameter of the cylinder, the resiliency of the wall 3 contributes little, if anything, to the tightness of the seal between the cylinder and the bellows. The cylinder 9 has an outer annular groove 4 near the annular end wall 11, and the resilient wall 3 is partly received in the groove under the pressure exerted on the face 17 of the wall 3 by the flange portion of the ring 5 which is similar to the ring 6 but has a relatively wide open side whereas the open side of the ring 6 between the free edges of the flange portions 14, 15 is much narrower than the depth of the channel constituted by the ring 6, as measured between the open side and the web portion 16.

Prior to assembly, the rings 5, 6 are wider open between their flange portions than in the illustrated assembled condition, and their inner diameters, as measured between opposite parts of the web portions, are greater than in the assembled condition. They are wide enough to be slipped with a loose fit over the radially superimposed and axially coextensive portions of the cup 2 and cylinder 9 respectively and of the wall 3.

As shown in phantom view with reference to the ring 6, pliers 10, or the jaws 12, 13 of a similar clamping tool are then applied to the flange portions 14, 15, and the ring 6 is compressed axially, that is, at right angles to the common radial plane of the engaged annular portions of the wall 3, the cup 2, and the ring 6, until the flanges 14, 15 move toward each other into the illustrated positions. The deformation causes the inner diameter of the ring 6 to be reduced and the outer diameter to be increased. The web portion 16 thus is shifted radially inward in a movement which does not have a significant circumferential component even if a tool as simple as pliers is used for compressing the ring 6. In large-scale production, time is saved and a precisely uniform cross section of the compressed ring is achieved by using annular jaws 12, 13 connected to the ram and anvil of a press.

Figure 2:
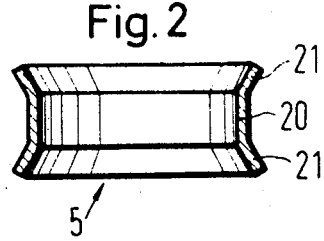
FIG. 2 illustrates a modified fastening ring of the invention prior to assembly with other elements and in axial section.

The ring 5 is deformed under axial pressure as described above with reference to the ring 6 for securing the wall 3 to the cylinder 9, and this is done before the bellows are assembled with the cup 2. The ring 5 initially differs from the ring 6 by its diameter and by its cross-sectional shape in a manner evident from FIG. 2.

Prior to axial deformation into the shape seen in FIG. 1, the ring 5 had flanges 21 which were joined to the web 20 at obtuse angles. The axial pressure exerted on the flanges 21 during assembly and the resistance of the wall 3 caused a rounding at these angles into the approximate C-shape or U-shape seen in FIG 1. The angular edges between the web 20 and the flanges 21 were never sharp enough to injure the rubber of the wall 3.

A ring 22 somewhat different from the ring 6 may be employed for sealing a tube 23 of pliable rubber to an inner surface 24 of the cup 2. The ring 22 is also C-shaped or approximately U-shaped in section in all axial planes, but its flanges extend from the web in a radially inward direction, and the annular channel of the ring 22 is inwardly open. One jaw of the tool employed for deforming the ring 22 when assembling the seal of FIG. 3 must be slipped through the center of the ring 22 after the tube 23 and the initially loosely fitting ring 22 were combined.

Figure 3:
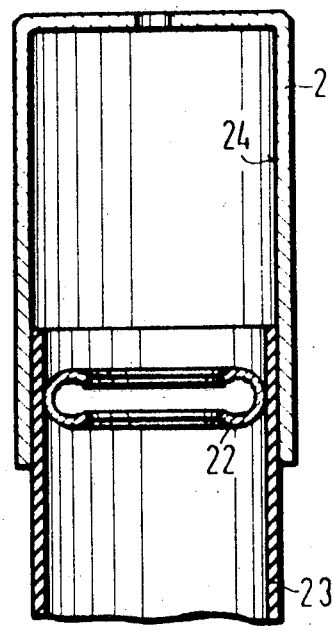
FIG. 3 shows a sub-assembly of a modified shock absorber in section on its axis.

The sub-assembly produced by compressing the ring 22 and shown in FIG. 3 is then slipped over the piston rod 8 and cylinder 9, and an eye 7 is welded to the cup 2. The tube 23 may be joined to the cylinder 9 by a fastening ring of the invention which engages the outer face of the tube 23 in the manner of the ring 6 in FIG. 1. However, adequate protection for the piston rod may be achieved if the lower end of the tube 23 loosely envelops the cylinder 9.

While the invention has been described with reference to telescopic shock absorbers, the specific nature of the suspension element 1 is not relevant to this invention. It may be a pneumatic or hydropneumatic spring. The illustrated and described assembly of a resilient tubular body with a more rigid second body and a relatively rigid fastening ring is also representative of other resilient tubes connected by this invention to rigid tubes elsewhere in an automotive vehicle and in applications outside the field of automotive engineering.

It should be understood, therefore, that it is intended to cover all changes and modifications of the examples of the invention chosen herein for the purpose of the disclosure, and that the invention, within the scope of the appended claims, may be practiced otherwise than as specifically disclosed.

What is claimed is:

1. A method of sealing a first tubular body having an annular wall of deformable material to a second body of more rigid material than said wall, said wall having an inner face bounding a bore in said first body and an outer face, said second body having a surface of annular cross section which method comprises:
   a. engaging respective annular portions of one of said faces and of said surface;
   b. enveloping an annular portion of the other face with a loosely fitting fastening ring so that said annular portions and said fastening ring extend in a common plane,
      1. said fastening ring extending in a closed loop in said plane and being a channel of approximately uniform cross section at right angles to said plane,
      2. said channel having a web portion directed toward said other face, said one face, and said surface, and two flange portions bounding the open side of said channel and being directed away from said other face; and
   c. compressing said fastening ring transversely of said plane until said flange portions approach each other and said web portion engages said other face with a pressure sufficient to hold the engaged portion of said wall under compressive stress in cooperation with said surface.

2. A method as set forth in claim 1, wherein said first body essentially consists of elastomeric material.

3. A method as set forth in claim 1, wherein said flange portions bound the open side of said channel, said ring having an axis, said open side being directed radially away from said web portion and said other face, and said flange portions approaching each other axially during said compressing.

4. A method as set forth in claim 3, wherein said flange portions extend from said web portion in a radially inward direction.

5. A method as set forth in claim 3, wherein said flange portions extend from said web portion in a radially outward direction.

* * * * *